US006316539B1

(12) United States Patent
Hobisch et al.

(10) Patent No.: US 6,316,539 B1
(45) Date of Patent: Nov. 13, 2001

(54) WATER DILUTABLE RESIN, A PROCESS FOR THEIR PRODUCTION AND APPLICATION THEREOF

(75) Inventors: Gerald Hobisch; Peter Tuemmler; Peter Morre, all of Graz (AT)

(73) Assignee: Vianova Resins AG (AT)

( * ) Notice: Subject to any disclaimer, the term of this patent is extended or adjusted under 35 U.S.C. 154(b) by 0 days.

(21) Appl. No.: 09/596,188

(22) Filed: Jun. 16, 2000

(30) Foreign Application Priority Data

Jun. 21, 1999 (AT) ...................................... 1083/99

(51) Int. Cl.$^7$ ................ C08J 3/00; C08K 3/20; C08L 51/00; C08L 61/00; C08L 75/00
(52) U.S. Cl. ............ 524/542; 524/591; 524/839; 524/840
(58) Field of Search ................ 524/591, 839, 524/840, 542

(56) References Cited

U.S. PATENT DOCUMENTS

| | | | |
|---|---|---|---|
| 3,819,586 | * 6/1974 | Rudolph et al. | ........... 260/77.5 TB |
| 4,644,028 | 2/1987 | Fischer et al. . | |
| 5,919,859 | 7/1999 | Orteit et al. . | |
| 5,962,582 | 10/1999 | Lange . | |
| 6,071,986 | * 6/2000 | Everhardus et al. | ................. 523/160 |

FOREIGN PATENT DOCUMENTS

| | | |
|---|---|---|
| A 34 06 474 | 8/1985 | (DE) . |
| 0 838 485 | 4/1998 | (EP) . |
| 0 838486 | 4/1998 | (EP) . |
| 0 827 973 | 11/1998 | (EP) . |

OTHER PUBLICATIONS

Ullmann's Encyclopedia of Industrial Chemistry, 4 Alfl., 12 S. 55, 1976.
Ullmann's Encyopedia of Industrial Chemistry, 5 Aufl,, A23, S. 104f.
U.S. Patent Application serial No. 09/166,524 Filed110/6/99.

* cited by examiner

Primary Examiner—Patrick D. Niland
(74) Attorney, Agent, or Firm—Propat, LLC

(57) ABSTRACT

Water-dilutable resins ABCD, obtainable by converting aldehyde or ketone resins A, multi-functional isocyanates B, aliphatic acids C, each with at least one acid group and one group that can react with isocyanates to form a urethane or urea structure, and also an aliphatic polyether D, with at least one hydroxyl group per molecule, whereby at least one of the educts C and D is used and if necessary, neutralization with aqueous ammonia or amines, provided a compound according to C is used.

10 Claims, No Drawings

WATER DILUTABLE RESIN, A PROCESS FOR THEIR PRODUCTION AND APPLICATION THEREOF

BACKGROUND OF THE INVENTION

1. Field of the Invention

The present invention relates to water-dilutable resins, suitable after neutralisation as pigment paste resins, obtainable by converting aldehyde or ketone-based hard resins with multi-functional isocyanates and at least one isocyanate-reactive component.

2. Description of the Related Art

Aldehyde or ketone-based hard resins, abbreviated in the industry to aldehyde or ketone resins, have been known for some considerable time. Due to their specific paint properties such as light colour, resistance to saponification and yellowing, compatibility with other paint binders and very good solubility in polar organic solvents, these hard resins are important raw materials for nitro-cellulose and alkyd resin paints. They have also achieved a major practical significance in special areas of application, such as base resins for solvent-containing universal pigment pastes. However, given the demand for environmentally compatible paints, aldehyde and ketone resins have a significant disadvantage for paint manufacturers and users: they are insoluble in water.

Patent literature contains only a few attempts to manufacture stable, aqueous, dispersions based on aldehyde and ketone resins, as an example described in U.S. Pat. No. 4,644,028 (corresponds to DE-A 34 06 474), in which a protective colloid and special co-polymer are also used.

A further method of making these resins water-soluble or water-dispersible is described in co-pending U.S. patent application Ser. No. 09/166,524, whereby the (hydroxyl-group-containing) aldehyde or ketone resins are converted using acid-group-containing polymers under condensation conditions. After (partial) neutralisation of the remaining acid groups, the condensates become water-dilutable. The condensation process however, significantly increases the size of the molecules; this decreases the level of compatibility with other resins. If the paste resins as described in this application are used in stoving paints, a slight to significant yellowing is observed. In the case of pigmented paints, this can lead to colour changes.

It has been known from U.S. Pat. No. 5,962,582 (corresponds to EP-A 0 838 485) to react hydroxy functional aldehyde or ketone resins with polycarboxylic acids, or esters, halides or anhydrides thereof, to make them water-reducible. The compounds thus obtained have freely accessible carboxyl groups which can cause incompatibility with pigments. Another method is described in U.S. Pat. No. 5,919,859 (corresponds to EP-A 0 838 486), where such aldehyde or ketone resins are reacted with hydrophilic isocyanates made by reaction of (polyfunctional)isocyanates with compounds that have, in addition to their hydrophilic or potentially hydrophilic, at least one isocyanate-reactive group which comprises an active hydrogen atom according to the Zerevitinov test. These products, however, have a fixed ratio of hydrophilic groups and (unreacted) isocyanate groups. Moreover, this process requires a two-step reaction. It is desirable, compared with this state of the art, to provide a simple and easily adaptable process which leads to a variety of products with different properties.

SUMMARY OF THE INVENTION

In accordance with the present invention, water-dilutable urethane-modified aldehyde or ketone-based resins ABCD are provided which are obtained by converting mass fractions in the reaction mixture of

- 10 to 90% aldehyde or ketone resins A, with a hydroxyl number of 20 to 300 mg/g, softening temperature of 60 to 140° C. and a number average molar mass $M_n$ of 500 to 3000 g/mol;
- 5 to 30% multi-functional isocyanates B with an average of at least 2 isocyanate groups per molecule;
- 0 to 30% aliphatic acids C, each with at least one acid group and at least one group that can react with isocyanate, creating a urethane or urea structure and also,
- 0 to 70% of an aliphatic polyether D with a number average molar mass $M_n$ of 200 to 8000 g/mol, and at least one hydroxyl group per molecule, wherein the total of the mass fractions of educts A to D is always 100% and at least one of the educts C and D is used and if necessary, subsequent neutralisation of the products ABCD with aqueous ammonia or amines, provided a compound according to C is used.

In further accordance with the present invention, there is provided a process for the synthesis of such urethane-modified aldehyde or ketone-based resins ABCD, which involves converting components A through D at increased temperatures, preferably at 30 to 200° C.

The resins according to the present invention show as little yellowing as possible when heated. The hydrophilic modification in these modified resins create only the slightest possible increase in the size of the molecule.

Further objects of this invention, and the features and advantages of the present invention will be set forth in, or be apparent from, the description that follows.

DETAILED DESCRIPTION OF THE PREFERRED EMBODIMENTS

It was found that it is possible to convert aldehyde and ketone resins with at least di-functional isocyanates and hydrophilic modification agents that have at least one isocyanate-reactive group and at least one hydrophilic, non-ionic or anionic group in the molecule. Combinations of such non-ionic and anionic hydrophilic modification agents can also be used.

The aldehyde or ketone resins A are formed though self-condensation or cocondensation together with formaldehyde, of aliphatic, cycloaliphatic or mixed aliphatic-aromatic ketones or aldehydes.

The aldehyde or ketone resins A can preferably be obtained by condensing (cyclo)aliphatic oxo-compounds A1 selected from (cyclo) aliphatic ketones A11 and aliphatic aldehydes A12 together with urea and its derivatives A2 (hereinafter described jointly as "urea").

For the purposes of this invention, urea derivatives A2 include N-alkylated, N-arylated or N-acylated urea, where a minimum of one and a maximum of 3 amide hydrogen atoms are substituted by an alkyl, aryl or acyl radical. Suitable alkyl radicals are linear, branched, and cyclic aliphatic radicals with 1 to 20 hydrogen atoms, suitable aryl radicals are (also alkyl-substituted)aryl radicals with 5 to 14 hydrogen atoms such as phenyl, naphthyl, o-tolyl or (p-phenyl)phenyl radicals. Acyl radicals are R-CO radicals, in which R can be the alkyl or aryl radicals mentioned here. Naturally, the amide hydrogen atoms can also carry various substitutes of the stated type. Such urea derivatives where an alkyl radical with 2 or 4 hydrogen atoms links the nitrogen atoms together, e.g. ethylene and propylene urea (2-imidazolidon or tetrahydro-2-pyrimidon) and their alkyl, acyl and aryl derivatives, where at least one amide hydrogen atom is retained, can also be used.

The aldehyde and ketone resins A, as already described, can be obtained by condensing ketones together with aldehydes and urea, ketones with urea or aldehydes with urea, and show preferably a hydroxyl number of 20 to 300 mg/g, a softening temperature of 60 to 140 C. and a number average molar mass of 500 to 3000 g/mol. These resins are usually produced by alkali-catalysed condensation of appropriate oxo-compounds in the presence of urea. Suitable ketone resins are derived predominantly from cycloaliphatic ketones A11 with preferably 5 to 12 hydrogen atoms in the ring such as cyclohexanone or its alkyl derivatives, whereby the cycloaliphatic ring can carry one or several alkyl groups and the alkyl groups each have 1 to 8 hydrogen atoms such as methyl cyclohexanone, 2-ethylhexyl cyclohexanone and tertiary butyl cyclohexanone. The resins can be obtained from these ketones or their mixtures by known methods (see Ullmann, $4^{th}$ Edition, 12, p. 551, 1976). Other suitable resins A are obtained by condensing aldehydes A12 in the presence of urea, substituted urea or their derivatives according to A2. Thus, the aliphatic aldehyde A12 is preferably linear or branched and has 2 to 20, preferably 4 to 10 hydrogen atoms. Condensates from iso-butyraldehyde, formaldehyde and urea (see Ullmann, $5^{th}$ Edition, A23, p. 104 f) are particularly preferred. Condensation products of the aldehyde itself, such as aldol and crotonaldehyde, can be condensed in the mixture with the aldehydes. When producing condensate mixtures from aldehydes and ketones with urea, formaldehyde can be used as component A12.

The hydroxyl number is defined in accordance with DIN 53 240 as the quotient of the mass $m_{KOH}$ of potassium hydroxide, which has precisely the same number of hydroxyl groups as a sample to be tested, and the mass $m_{KOH}$ of this sample (mass of solid matter in the sample with solutions or dispersions), their standard unit is "mg/g".

The multi-functional isocyanates B have, in the average, at least two isocyanate groups per molecule.

Preferably, the multi-functional isocyanates B are selected from B2 (cyclo)aliphatic, B2 mixed aliphatic aromatic and B3 aromatic isocyanates with an average of at least 2 isocyanate groups per molecule.

The isocyanates B do not contain hydrophilic or potentially hydrophilic groups, such as may be obtained by reacting at least one (polyfuntional) isocyanate with compounds having, in addition to their hydrophilic or potentially hydrophilic group (a group that is rendered hydrophilic after neutralisation), at least one group that is reactive towards isocyanate, and comprising an active hydrogen atom, according to the Zerevitinov test.

Examples of suitable isocyanates are trimethylene diisocyanate, tetramethylene diisocyanate, pentamethylene diisocyanate, hexamethylene diisocyanate (HDI), 1,2-propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate (TDI), 2,6-toluylene diisocyanate (TDI), 4,4'-biphenylene diisocyanate, 1,5-naphthylene diisocyanate, 1,4-naphthylene diisocyanate, 1 isocyanatomethyl-5-isocyanato-1,3,3-trimethyl-cyclohexane (IPDI),bis(4-isocyanatocyclohexyl) methane (HMDI), 4,4'-diisocyanatodiphenylether, 2,3-bis-(8-isocyanatooctyl)-4-octyl-5-hexylcyclohexane, the isomeric tri-methyl-hexamethylendiisocyanates, tetra-methyl-xylyene diisocyanate (TMXDI), uretdione and isocyanates from the above di-isocyanates and also allophanates and biurets derived from the above diisocyanates. Mixtures of such di- or poly-isocyanates may also be used. The diisocyanates, particularly TDI, TMXDI, HDI, HMDI and IPDI and their uretdiones, isocyanurate, allophanates and biurets are particularly preferred.

Aliphatic acids C which can be used according to the present invention have at least one acid group, and at least one group that can react with an isocyanate, by which reaction a urethane structure (if the isocyanate-reactive group is a hydroxyl group) or a urea structure (if the isocyanate-reactive group is an amino group) is created. It is also possible to form a thiourethane structure (if there is a mercapto group) or a semicarbazide structure (if there is a hydrazine group).

Suitable aliphatic acids C have at least one group that is reactive towards isocyanate, such as hydroxyl groups, amino groups, mercapto groups or hydrazine groups, and also one acid group, preferably a carboxylic or sulphonic acid group. Thus, the molecules suitable as components C may also contain various types of groups, for example, an amino group, a hydroxyl group and a carboxylic acid group or a hydroxyl group, a carboxylic and a sulphonic acid group in one molecule. Particularly hydroxy-carboxylic acids such as lactic acid, di-methylolpropionic acid, tart, glyoxylic acids, di-hydroxysuccinic acid and malic acids, amino acids such a glycine, alanine, omithine, aspartic acid, taurine, hydroxy-amino acids such as tyrosine or mercapto-amino acids such as cysteine are preferred. Dimethylolpropionic acid is particularly preferred. These components may also contain mixtures of several of the suitable substances.

Aliphatic polyethers D carrying hydroxyl groups have a number average molar mass $M_n$ of 200 to 8000 g/mol and at least one hydroxyl group per molecule; the mass fraction of oxy-ethylene moieties in the poly-ether(poly)ol is usually at least 50%, preferably at least 80%. Polyoxyalkylene glycols and their copolymers with polyoxypropylene components are suitable. Polyether polyols etherfied on one side may also be used, these include poly-ethylene glycol-monomethyl or ethyl ethers. Poly-ethylene glycols with (number average) molar masses $M_n$ of 200 to 8000 g/mol. and their mono-methyl ethers are preferred.

Preferably, in the reaction mixture according to the present invention, the mass fractions in the reaction mixture of A are 35 to 85%, of B, 10 to 25%, of C, 2 to 10% and of D, 5 to 30%, whereby the mass fraction of C can be equal to zero, if at least one polyether D is used, or the mass fraction of D can be equal to zero, if at least one of the acids C is used.

The resins ABCD in accordance with the invention can be obtained by converting components A through D at increased temperatures, preferably 30 to 200° C., preferably in the melt without the addition of a solvent where, however, a solvent E', which is inert and preferably water-dilutable under the reaction conditions, can be added if necessary in mass fractions of up to 20%, relating to the total mass of components A to D and the solvent. It is possible to react only components A and B in the first place, which may also yield adducts of several molecules of component A linked by urethane bonds, and then to add C and/or D. On the other hand, although less preferred, only components B and C may be reacted in the first place, and component A may be added later. Another variation is to react component A with an excess of polyfunctional isocyanates B and then to convert the unreacted isocyanate groups by reaction with preferably monofunctional compounds C and/or D (having only one active hydrogen atom), which mode leads to the lowest growth of the molecule. It may also be advantageous to use mixtures of C and D. Proper choice of addition time and amount of reactants controls the structure and properties of the molecules thus obtained. The conversion takes place until the content of unreacted isocyanate groups in the reaction mixture has reached a value of less than 0.1 g/(100 g). Then a (further) water-dilutable solvent E is added and, provided compounds according to C were used, at least partially neutralised by adding amines or aqueous ammonia. The alkali quantity is set such that at least half the acid groups of the resin are neutralised. Complete neutralisation is preferable.

The ratio of the mass of solvents E and E' to the mass of the resin ABCD is preferably 1:9 to 9:1, particularly 2:8 to 4:6. A mass fraction of solvent in the solution of approx. 4to 10% appears to be particularly advantageous.

The water-dilutable solvent E' can be solvents that contain no group reactive towards isocyanate groups. Dialkyl ethers of ethylene glycol and its oligomers such as di-methoxyethane, di-ethylene glycol-di-methyl and di-ethyl ether, di and tri ethylene glycol di-acetate, acetone, methyl-ethyl ketone and di-ethyl ketone are preferred.

The solvents E are water-dilutable and may also contain groups that can react with isocyanates. In addition to the solvents described under E', mono-alkyl-ethers of ethylene glycol and its oligomers are particularly preferred. These include particularly methoxyethanol, ethoxyethanol and butoxyethanol and also the methyl, ethyl and butyl-ethers of di and tri-ethylene glycol and also higher oligomers.

The product obtained can be diluted in water to form a clear to milky/cloudy dispersion with mass fractions of 5 to 60% of the resin ABCD in the dispersion. It is also possible to set the concentration of neutralising agent such that dilution and neutralisation can occur simultaneously. An aqueous solution or dispersion of the neutralised resin is thus obtained.

The resin ABCD produced in accordance with the invention can be used for example to produce water-dilutable coating agents. They are extremely suitable as paste resins to produce low-solvent and solvent-free pigment pastes. They have a high pigment binding capacity, are stable when stored and in the form of the pigment paste, do not change or change their viscosity only slightly during storage. This pigment paste can easily be integrated into aqueous binders. Compared to directly pigmented pastes, there is no negative effect on the coating properties.

The following examples describe the invention, without limiting its scope.

In the following examples, as in the text above, all data accompanied by the "%" sign mean mass fractions, unless otherwise specified. "Parts" (abbreviated to "pts" are always mass fractions. Concentrations in "%" are mass fractions of the dissolved substance in the solution.

Examples

1 Producing Water-dilutable Resins

Mixtures of the educts A, B, C and D were produced according to the details in Table 1 in the absence of solvents and heated by agitation to a temperature of approx. 80° C. The reaction mixtures were held at this temperature, until no more free isocyanates could be detected. The reaction mixture was dissolved in a water-dilutable solvent and neutralised by adding the type and quantity of neutralisation agent stated in the table. Before the neutralisation agent is added, the acid number was determined (see Table 1).

"DMPS" means dimethylol propionic acid, "PEG 750" stands for a polyoxyethylene glycol with an average molar mass of approx. 750 g/mol. "BuOEtOH" means 2-butoxyethanol. As a neutralisation agent, aqueous ammonia solution ("NH$_4$OH") (25% NH$_3$ in aqueous solution), tri-ethanolamine ("TEA") and/or tri-ethylamine ("Et$_3$N") were used. "HDI" means 1,6-di-isocyanato hexane, "TDI" is the commercially obtainable mixture of tolylene-diisocyanate and "IPDI", isophorone-diisocyanate. "A" stands for a standard acetaldehyde-based, aldehyde resin with an acid number of 1.5 mg/g, "K" means a cyclohexanone ketone resin with a hydroxyl number of 110 to 150 mg/g.

TABLE 1

| Resin | B1 | B2 | B3 | B4 | B5 | B6 | B7 |
| --- | --- | --- | --- | --- | --- | --- | --- |
| Aldehyde/Ketone Resin | A | A | K | A | K | K | K |
| m in g | 1000 | 1000 | 1380 | 1000 | 1380 | 1380 | 1380 |
| Isocyanate | HDI | IPDI | TDI | TDI | HDI | TDI | TDI |
| m in g | 168 | 156 | 522 | 122 | 504 | 522 | 522 |
| Anionogenic Modifying Agent | DMPS | DMPS | DMPS | DMPS | DMPS | DMPS | |
| m in g | 67 | 67 | 201 | 67 | 124 | 134 | |
| Non-ionic Modifying Agent | | | | | | PEG | PEG |
| m in g | | | | | | 750 | 750 |
| Acid Number of Resin mg/g | 22.5 | 23 | 40.3 | 23.5 | 25.8 | 20.1 | 0 |
| Solvent | BuOEtOH | BuOEtOH | BuOEtOH | BuOEtOH | BuOEtOH | BuOEtOH | BuOEtOH |
| m in g | 400 | 400 | 400 | 400 | 400 | 400 | 400 |
| Neutralisation Agent | NH$_4$OH | TEA | Et$_3$N | Et$_3$N | TEA | TEA | |
| m in g | 30.6 | 45.5 | 136.5 | 45.5 | 84.2 | 91.0 | 0 |

The compositions are described by stating the mass m of the particular educt (starting substance) in g.

2 Coating Test for Pigment Paste Resins B1 to B7

From pigment paste resins B1 to B7, white pigment pastes were produced according to the following recipe:

250 parts pigment paste resin, 40% in water
20 parts Additol ® VXW 6213 (wetting agent)
2 parts Additol ® VXW 6210 (anti-foaming agent)
3 parts Additol ® XL 297 (anti-skin agent for air-dried coating binders)

-continued

| 100 parts water |
| --- |
| 375 parts pigment paste resin preparation |
| 500 parts titanium dioxide pigment (®Kronos 2310) |

The viscosity of the pastes was between 700 and 1000 mPa·s.

The paste resins produced in accordance with the invention are stable when stored and have a high pigment-binding capacity.

3 Coating Test

Using pigment paste from resin B3 and pigment paste from resin B4, paints were produced using various aqueous binders in the mass of pigment ($m_p$) to mass of binder ($M_b$) ratios shown in Table 2.

TABLE 2

| Paint No. | L1 | L2 | L3 | L4 | L5 | L6 |
| --- | --- | --- | --- | --- | --- | --- |
| Binder | a | b | c | d | a | d |
| Pigment Paste | From B3 | From B4 | From B3 | From B4 | From B3 | From B4 |
| $m_P/m_B$ | 1:1 | 0.2:1 | 0.2:1 | 1:1 | 0.2:1 | 0.2:1 |

Binder a is a water-dilutable acrylate-modified long oil alkyd resin, which is dispersed in water to form a solid mass fraction of approx. 38% (®Resydrol AY 586 w by Vianova Resins AG).

Binder b is a mixture of water-dilutable acrylate-modified long-oil alkyd resin with an unmodified water-dilutable long-oil alkyd resin, dispersed in water to form a solid mass fraction of approx. 45% (®Resydrol VAY 6278 by Vianova Resins AG).

Binder c is an aqueous polyurethane dispersion modified with drying fatty acids (®Daotan VTW 1252, Vianova Resins GmbH & Co KG).

Binder d is a water-dilutable alkyd resin modified with epoxy resin, dissolved in 2-butoxyethanol to form a solid mass fraction of approx. 70% (®Resydrol AX246 by Vianova Resins AG).

These paints L1 to L6 have been used to coat steel plates with a wet film layer thickness of 150 µm. The degree of yellowing after stoving was determined from the test plates. To compare V1 to V6, directly pigmented binders a to d were used with the same pigment-binder-ratio and the same additives.

Pendulum hardness was determined in accordance with Konig (DIN 53 157) after a one and/or seven day period of storage at room temperature after application and stoving.

The mechanical resistance of the layers was tested with a dry layer thickness of 30 to 35 µm after a 7 day period of storage at room temperature in accordance with DIN EN ISO 1520 and by impact testing in accordance with ASTM D 2794, the propensity to corrosion was tested by storing in water at 40° C. in accordance with ISO 2812 T2 and through humid chamber resistance (tropical climate test) in accordance with DIN 53210.

TABLE 3

| Test | Pendulum Hardness in s | | | |
| --- | --- | --- | --- | --- |
| Paint | After 1 Day | After 7 Days | Mechanical Test | Corrosion Test |
| L1 | 22 | 39 | 0 | + |
| V1 | 22 | 39 | | |
| L2 | 39 | 37 | 0 | 0 |
| V2 | 30 | 32 | | |
| L3 | 50 | 110 | 0 | 0 |
| V3 | 50 | 72 | | |
| L4 | 156 | 148 | − | 0 |
| V4 | 157 | 148 | | |
| L5 | 9 | 44 | 0 | 0 |
| V5 | 11 | 37 | | |
| L6 | 167 | 171 | − | 0 |
| V6 | 170 | 171 | | |

0: No difference between the L and V samples
+: L sample is up to 10% better in the test that the V sample
−: L sample is up to 10% worse in the test than the V sample These results show that it is possible to produce a variety of aqueous pigment pastes using the paste resins in accordance with the invention and to pigment paints with outstanding results, without adversely affecting the application profile of the paint. At the increased the temperature during the stoving process, the paint does not yellow or yellows only slightly. This is an essential advantage over the water-dilutable pigment paste resins known from AT 1682/97 that are based on aldehyde or ketone resins. The known handling advantages in respect of using pigment pastes compared with directly pigmented paints can also be achieved by using aldehyde or ketone resins in aqueous paint systems, without the paint produced from such pastes and the coatings so produced being any less useful.

Additional features and modifications will readily occur to those skilled in the art. Therefore, the present invention is not limited to the specific details as shown and described herein. Accordingly, various modifications may be made without departing from the spirit or scope of the general inventive concept as laid down herein and defined by the appendend claims.

What is claimed is:

1. Water-dilutable urethane-modified paste and mixing resins ABCD, obtained by converting mass fractions in the reaction mixtures of 10 to 90% aldehyde or ketone resins A formed through self-condensation or cocondensation together with formaldehyde, of aliphatic or cycloaliphatic ketones or aldehydes, with a hydroxyl number of 20 to 300 mg/g, a softening temperature of 60 to 140° C. and a number average molar mass $M_n$ of 500 to 3000 g/mol;

5 to 30% multi-functional isocyanates B with an average of at least 2 isocyanate groups per molecule;

0 to 30% aliphatic acids C, each with at least one acid group and at least one group that can react with isocyanate, creating a urethane or urea structure and also, 0 to 70% of an aliphatic polyether D with a number average molar mass $M_n$ of 200 to 8000 g/mol, and at least one hydroxyl group per molecule, whereby the total of the mass fractions of educts A to D is always 100% and at least one of the educts C and D is used and if necessary, subsequent neutralisation of the products ABCD with aqueous ammonia or amines, if a compound in accordance with C is used.

2. Water-dilutable urethane-modified pastes and mixing resins ABCD according to claim 1, characterised in that the aldehyde and/or ketone resins A can be obtained by condensing (cyclo)aliphatic oxo-compounds A1, selected from (cyclo)aliphatic ketones A11 and aliphatic aldehydes A12 together with urea and/or its derivatives A2 (hereinafter described jointly as "urea").

3. Water-dilutable urethane-modified pastes and mixing resins ABCD according to claim 1, characterised in that the multi-functional isocyanates B are selected from B1 (cyclo) aliphatic, B2 mixed aliphatic-aromatic and B3 aromatic isocyanates with an average of at least 2 isocyanate groups per molecule.

4. Water-dilutable urethane-modified paste and mixing resins ABCD according to claim 1, characterised in that the aliphatic acids C, have at least one acid group selected from carboxylic and sulphonic acid groups and at least one group that can react with isocyanates to create a urethane or urea structure.

5. Water-dilutable urethane-modified paste and mixing resins ABCD according to claim 1, characterised in that the aliphatic polyether D has a mass fraction of at least 50% of oxy-ethylene moieties.

6. A process for producing water-dilutable urethane-modified pastes and mixing resins ABCD by converting mass fractions in the reaction mixtures of 10 to 90% aldehyde and ketone resins A, with a hydroxyl number of 20 to 300 mg/g, a softening temperature of 60 to 140° C. and a number average molar mass $M_n$ of 500 to 3000 g/mol.;

5 to 30% multi-functional isocyanates B with an average of at least 2 isocyanate groups per molecule;

0 to 30% aliphatic acids C, each with at least one acid group and at least one group that can react with isocyanate, creating a urethane or urea structure and also, 0 to 70% of an aliphatic polyether D with a number average molar mass $M_n$ of 200 to 8000 g/mol, and at least one hydroxyl group per molecule, at a temperature of 30 to 200° C., until the mass fraction of isocyanate groups in the reaction mixture has fallen to below 0.1%, subsequent addition of water-dilutable solvent E, where the ratio of the mass of solvents E to the mass of the resin ABCD is 1:9 to 9:1, and neutralisation with aqueous ammonia or amines, provided a compound according to C was used.

7. The process of claim 6 wherein component A is reacted with an excess of polyfunctional isocyanates B in the first step, and the unreacted isocyanate groups are consumed by reaction with compounds selected from components C and D.

8. The process of claim 7 wherein the compounds selected from components C and D are monofunctional.

9. The process of claim 7 wherein mixtures of compounds according to C and D are used.

10. A method for manufacturing a pigment paste comprising incorporating pigments into the water-dilutable resins ABCD as claimed in claim 1.

* * * * *